May 29, 1923. 1,456,603
M. B. KATO
ROTARY ENGINE
Filed Jan. 15, 1920 3 Sheets-Sheet 1
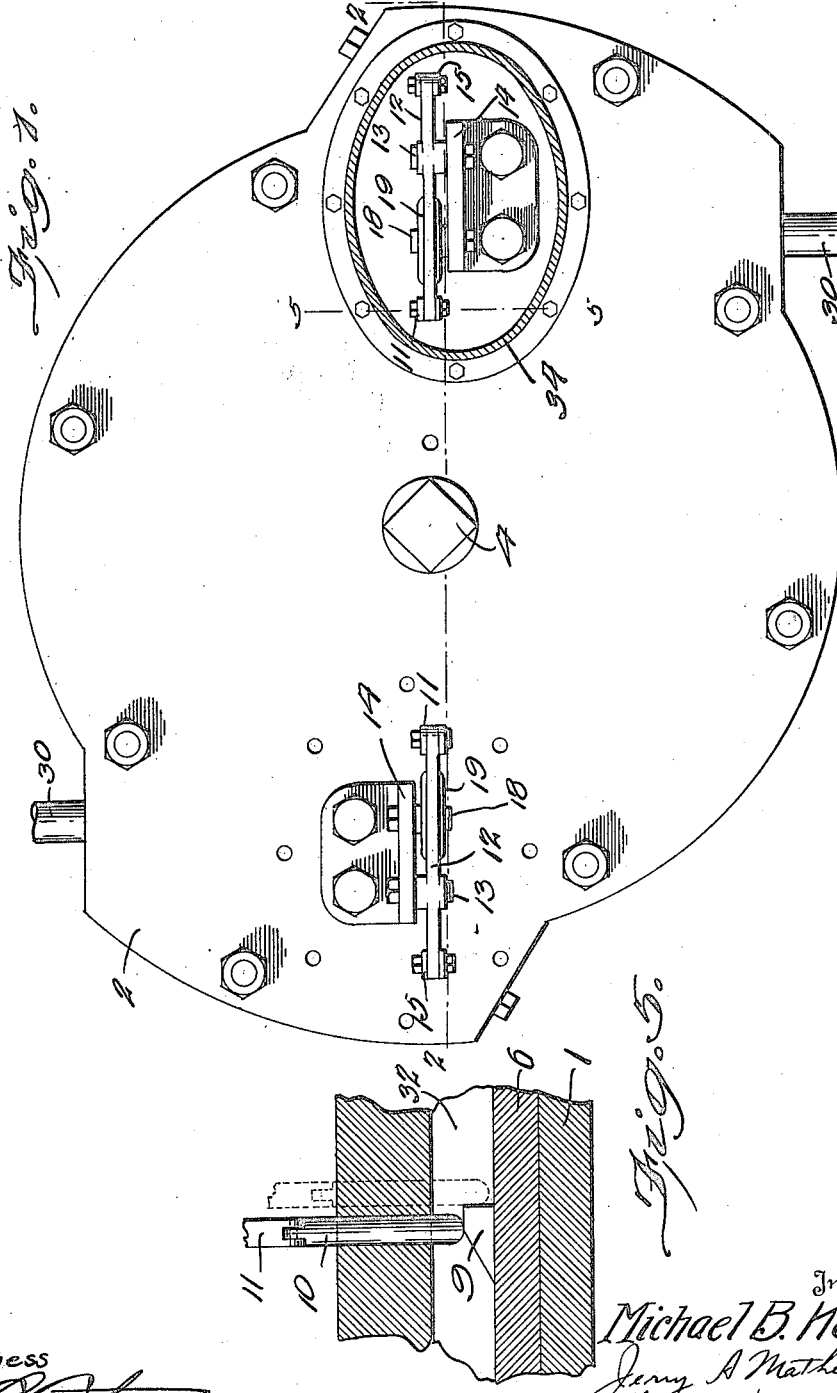

May 29, 1923. 1,456,603
M. B. KATO
ROTARY ENGINE
Filed Jan. 15, 1920 3 Sheets-Sheet 2
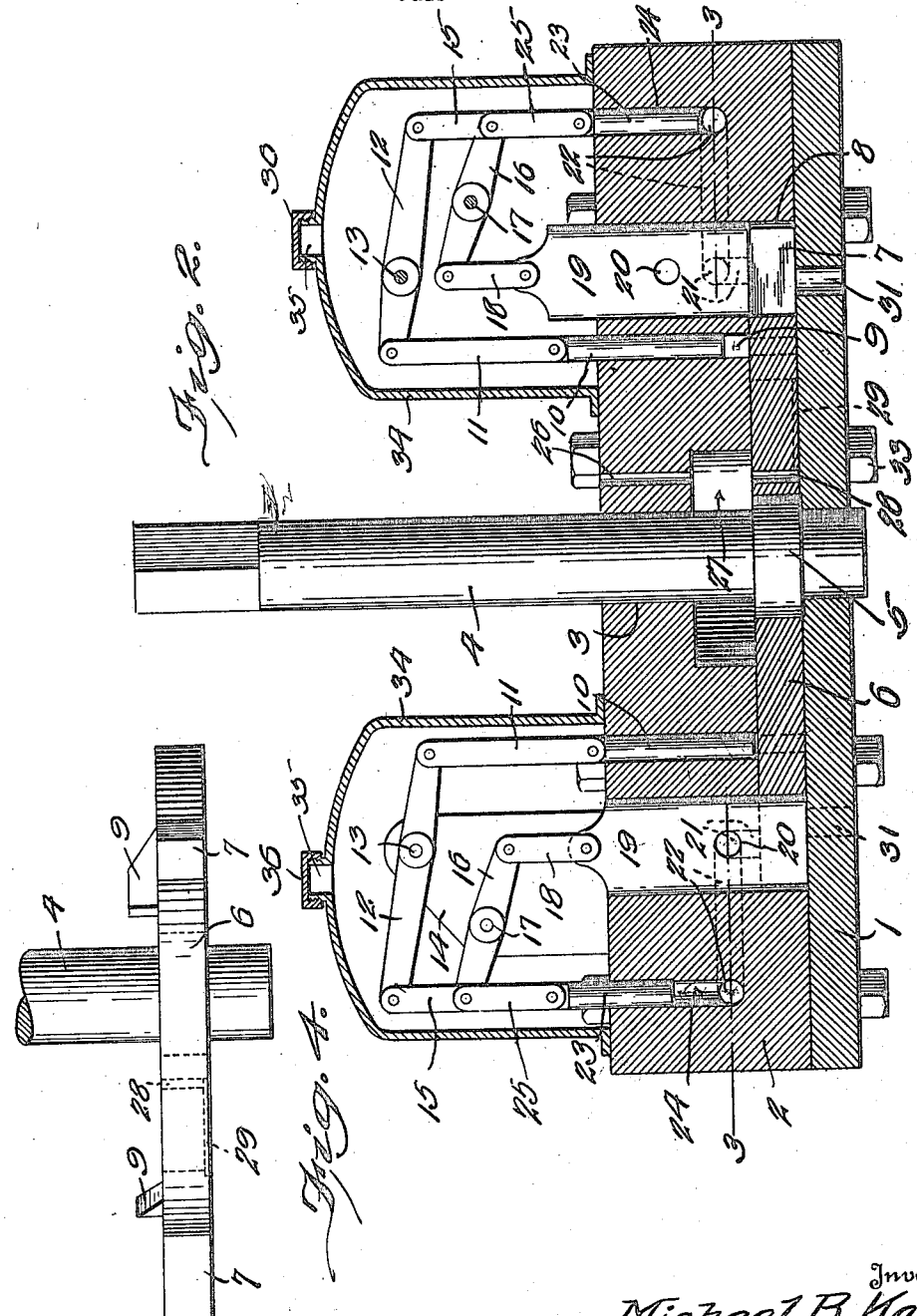
Inventor
Michael B. Kato

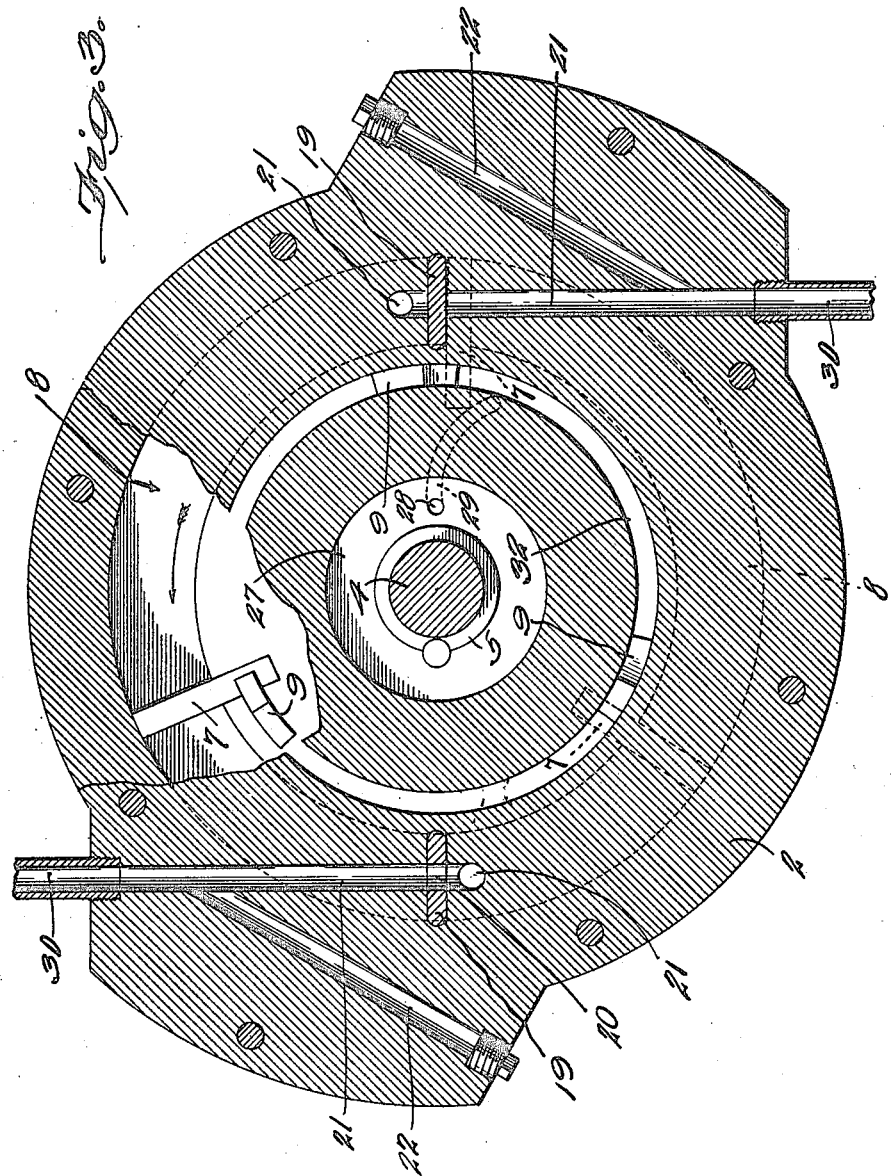

Patented May 29, 1923.

1,456,603

UNITED STATES PATENT OFFICE.

MICHAEL B. KATO, OF DUQUESNE, PENNSYLVANIA.

ROTARY ENGINE.

Application filed January 15, 1920. Serial No. 351,691.

*To all whom it may concern:*

Be it known that I, MICHAEL B. KATO, a citizen of the United States, residing at Duquesne, in the county of Allegheny and State of Pennsylvania, have invented a new and useful Rotary Engine, of which the following is a specification.

The object of my invention is to provide a novel rotary engine having a comparatively small number of parts, and in which no springs are employed and in which there is no dead center, the action of every moving part being positively and instantly effected; and to provide a type of engine in which the flow of steam is not diminished by operation of the engine; and is arrived at by the novel combination and arrangement of parts hereinafter described and as illustrated in the accompanying drawings, in which—

Figure 1 is a top plan of the invention, partly in section;

Fig. 2 is a section on line 2—2 of Fig. 1;

Fig. 3 is a section on line 3—3 Fig. 2 looking toward the base of the engine;

Fig. 4 is a side elevation of the rotor; and

Fig. 5 is a detail sectional view on the line 5—5 of Fig. 1.

Like numerals designate like parts throughout the views.

Referring to the accompanying drawings, I provide a suitable bottom plate or base 1, on which is mounted an engine casing or jacket 2, which members are provided with essential bore 3 in which is mounted a central shaft 4. Shaft 4 is provided with a hub 5 on which is mounted the rotor 6, which is provided with 3 rotor blades 7 travelling within the annular steam chest 8. Rotor 6 is also provided with cams 9 of the shape shown in Fig. 4, which travel in a raceway 32 and are positioned in a predetermined relation adjacent rotor blades 7 for the purpose of determining the time of the admission of steam relative to the position of the rotor blades 7.

Referring to Fig. 2, I provide opening pistons 23 and closing pistons 10. Opening pistons 23 are connected by links 25 and 15 with the respective cross-arms 16 and 12. Cross-arm 12 is mounted on a suitable pivot 13 carried by the stand or bracket 14, and at its other end is connected by link 11 to the closing pistons 10. The cross-arm 16 which is mounted by pivot 17 carried by stand or bracket 14 is connected by a link 18 to a gate-valve 19. Gate-valve 19 is provided with a valve passage 20 as shown in Fig. 2. Valve 19 with its valve passage is adapted to open and close the intake port 21 and thus control the inflow of steam through intake port 21 from inlet pipe 30. I further provide a branch steam passage or by-pass 22, preferably arranged as shown in Fig. 3 in connection with intake port 21 at a point in advance of the gate valve 19. Branch steam passage 22 conducts steam from the main intake conduit 21 to chamber 24, where it exerts pressure on piston 23, forcing it up and thereby, by means of link 25, cross arm 16, and link 18 exerting downward pressure on gate valve 19 to hold passage 20 in coincidence with passage 21 until a reverse operation is effected by contact of cam 9 with piston 10. Those pistons 23 are reciprocable in passages 24 and control the intake of steam. I provide through bottom plate on opposite sides two exhaust ports 31 opening out of steam chamber 8.

Referring to Fig. 2 I provide a suitable oil feed passage 26 in jacket 2 which passage communicates with oil reservoir 27; encircling the shaft 4 I further provide an oil passage 28 extending through rotor 6 from oil reservoir 27 to the bottom surface of the rotor, which surface is provided with a tangential grove 29 through which oil is supplied by oil passage 28 to the upper surface of bottom plate 1 on which the rotor 6 rotates. I provide suitable oil housings 34 mounted on engine jacket 2 and enclosing cross-arms 12 and 16 and the link and piston attached thereto, so that these parts may operate in an oil bath. Housings 34 are provided with openings 35 covered with caps 36 as illustrated in Fig. 2.

In operation steam flows into the engine through pipe 30 and intake ports 21 to the steam chamber 8 where its continuous pressure on the adjacent rotor blades 7 rotates the rotor 6; as rotor 6 revolves its cams 9, alternately raise the gate valves 19 thus closing the intake steam port 21 and then release the steam pressure being continuous in the by-pass 22 and in the chamber 24, regardless of the action of gate valves 19, said by-pass 22 leading the steam away to come in contact with pistons 23 in chamber 24. There are three cams 9, corresponding with the rotor blades 7 of which there are also 3. The number of rotor blades is important in relation to the exhaust ports 81 of which there are two, for the relative number and arrangement of ports shown is essential to the operation of the engine in the manner described. The gate valves, of which there are two, are placed on opposite sides of the rotor, or at 180 degrees of a circle, while the rotor blades are disposed 120 degrees apart, the object of this arrangement being to prevent a dead center occurring.

I prefer to provide a bottom plate 1 of larger diameter than the jacket or casing 2 to make provision for bolts whereby to admit of its being readily bolted to a suitable foundation. The bolts by which the jacket and bottom plate of the engine are fastened together form a support upon which the engine rests. An important feature of my invention is the elimination of springs eccentric discs and wearing plate attachments from its construction. The flow of steam into the steam chamber is continuous.

Incoming steam forces a pressure most of the time against the sides of two blades while the third blade is neutral, hence the third blade being neutral it neutralizes only the third part of the total volume of the steam chamber, thereby it exhausts from the opposite sides of the intake port of two blades which are in contact with the steam pressure according to the conjunction pertaining to the blade passing neutrality from one to another.

I provide a steam line to and through the slot in jacket or casing in which gate valve works into the steam chamber. I also provide a branch steam line that branches off at a point in advance of the gate valves to a cylinder which holds the gate valve open due to the continuous steam pressure under the piston which operates in conjunction with another piston on the opposite side of the gate valve which is operated by the cam on the rotor, which closes the gate valve.

The power of locomotion or driving power multiplies itself as many times the volume pressure of steam as there are number of gate valves and inlets to the steam chamber in proportion to the blades, that is, two inlets and two gate valves to three blades, or, three inlets and three gate valves to four blades, there being always one more blade than there are inlet and gate valves, whereby there is only one blade that is dead and not forced by steam.

What I claim is—

1. The combination in a rotary engine having opposite exhaust passages and opposite intake passages of an engine jacket having an annular steam chamber, a center shaft, a rotor affixed to the center shaft within the engine jacket, said rotor having a plurality of equally spaced radiating blades, the number of said rotor blades being one in excess of the number of exhaust ports, gate valves arranged to open and close the intake passage at pre-determined times, branch steam passages opening out of the intake passages, and pistons operated by the steam from said branch passages, means operatively connecting the last named passages with the gate valves, and cams on the rotor adapted to engage elements operatively connected with the gate valves to regulate the intake and exhaust in accordance with pre-determined conditions, substantially as described.

2. The combination in a rotary engine having opposite exhaust passages and opposite intake passages, of an engine jacket having an annular steam chamber, a center shaft, a rotor affixed to the center shaft within the engine jacket, said rotor having a plurality of equally spaced radiating blades, gate valves arranged to open and close the intake passage at predetermined times, branch steam passages opening out of the intake passages, reciprocating valve pistons operating within the steam passages and adapted to open and close the ports, cam-controlled pistons in conjunction with the gate valves, means operatively connecting the respective pistons named, and a plurality of cams on the rotor arranged to open the gate valves and allow steam to impinge against the rotor blades at predetermined times.

3. The combination in a rotary engine having spaced exhaust passages and intake passages, of an engine jacket having an annular steam chamber, a center shaft, a rotor affixed to the center shaft within the engine jacket, said rotor having a plurality of spaced radiating blades, gate valves arranged to open and close the intake passages at predetermined times, branch steam passages in communication with the intake passages, valve pistons operated by the steam from the aforesaid passages, gate valves controlling the intake of steam, means for actuating the gate valves, said means also being arranged to operate the valve pistons, cam means arranged in a predetermined relation to the rotor blades to open the gate valves at predetermined times to supply continuous steam pressure in one direction within the steam chamber acting on the rotor blades, said gate valves having their outer ends arranged to act as an abutment in the steam chamber when the gate valves open the steam ports.

4. The combination in a rotary engine having exhaust passages and intake passages, of an engine jacket having an annular steam chamber, a center shaft, a rotor affixed to the center shaft within the engine jacket, said rotor having a plurality of spaced radiating blades, the number of said rotor blades being one in excess of the number of exhaust ports, valve means arranged to open and close the intake passages at predetermined times, branch steam passages opening out of the intake passages, pistons operated by the steam from said branch passages, means operatively connecting the last named pistons with the aforesaid valve means controlling the intake passages, oil housings enclosing the valves and valve actuating means, and cam means on the rotor operatively connected with the valve means and arranged to regulate the intake and exhaust in accordance with predetermined conditions, substantially as set forth.

5. The combination in a rotary engine having exhaust passages and intake passages, and having an annular steam chamber, of a rotor, said rotor having radiating blades, gate valves arranged to open and close the intake passage at predetermined times, branch steam passages opening out of and in communication with the intake passages, pistons operated by steam from said branch passages, means operatively connecting the last named pistons with the gate valves, and cams on the rotor adapted to actuate the gate valves to regulate the intake and exhaust in accordance with predetermined conditions.

MICHAEL B. KATO.